United States Patent
Park et al.

(10) Patent No.: US 10,873,065 B2
(45) Date of Patent: Dec. 22, 2020

(54) BATTERY CELL DEGASSING APPARATUS

(71) Applicant: LG CHEM, LTD., Seoul (KR)

(72) Inventors: Hyo-Jin Park, Daejeon (KR);
Myung-Hyun Kim, Daejeon (KR);
Joon-Sung Bae, Daejeon (KR);
Eui-Kyung Lee, Daejeon (KR);
Jin-Woo Heo, Daejeon (KR);
Suk-Hyun Hong, Daejeon (KR)

(73) Assignee: LG Chem, Ltd.

( * ) Notice: Subject to any disclaimer, the term of this patent is extended or adjusted under 35 U.S.C. 154(b) by 65 days.

(21) Appl. No.: 16/318,813

(22) PCT Filed: Nov. 2, 2017

(86) PCT No.: PCT/KR2017/012337
§ 371 (c)(1),
(2) Date: Jan. 18, 2019

(87) PCT Pub. No.: WO2018/101618
PCT Pub. Date: Jun. 7, 2018

(65) Prior Publication Data
US 2019/0207183 A1 Jul. 4, 2019

(30) Foreign Application Priority Data
Dec. 1, 2016 (KR) .................. 10-2016-0162977

(51) Int. Cl.
*H01M 10/52* (2006.01)
*H01M 2/12* (2006.01)
(Continued)

(52) U.S. Cl.
CPC ............... *H01M 2/12* (2013.01); *H01M 2/02* (2013.01); *H01M 2/1241* (2013.01);
(Continued)

(58) Field of Classification Search
CPC ............................... H01M 10/52; H01M 2/12
See application file for complete search history.

(56) References Cited

U.S. PATENT DOCUMENTS

| 2013/0244093 A1 | 9/2013 | Min et al. |
| 2013/0244095 A1* | 9/2013 | Min ................... H01M 2/365 |
| | | 429/185 |

FOREIGN PATENT DOCUMENTS

| JP | 2000-021450 A | 1/2000 |
| KR | 10-2003-0062511 A | 7/2003 |

(Continued)

OTHER PUBLICATIONS

International Search Report for PCT/KR2017/012337 (PCT/ISA/210) dated Mar. 8, 2018.

*Primary Examiner* — Olatunji A Godo
(74) *Attorney, Agent, or Firm* — Lerner, David, Littenberg, Krumholz & Mentlik, LLP (57) ABSTRACT

A battery cell degassing apparatus for degassing a battery cell having a gas pocket, which includes a chamber cover to which the battery cell is detachably mounted, a vacuum chamber coupled to the chamber cover and configured to accommodate the battery cell in a vacuum environment, the chamber cover being slidable in a horizontal direction with respect to the vacuum chamber, a piercing unit provided at the vacuum chamber to pierce a part of the gas pocket, and a pressing unit provided at the vacuum chamber to be spaced apart from the piercing unit and configured to flatten an upper surface and a lower surface of the battery cell and to discharge a gas inside the battery cell to the outside of the battery cell is provided.

15 Claims, 12 Drawing Sheets

(51) Int. Cl.
  *H01M 2/02* (2006.01)
  *H01M 10/04* (2006.01)
  *H01M 10/0585* (2010.01)
  *H01M 10/42* (2006.01)
  *H01M 10/052* (2010.01)

(52) U.S. Cl.
  CPC ....... *H01M 10/04* (2013.01); *H01M 10/0481* (2013.01); *H01M 10/0585* (2013.01); *H01M 10/42* (2013.01); *H01M 10/52* (2013.01); *H01M 10/052* (2013.01)

(56) References Cited

FOREIGN PATENT DOCUMENTS

| KR | 10-2012-0009661 A | 2/2012 |
| KR | 10-2013-0044776 A | 5/2013 |
| KR | 10-2013-0052064 A | 5/2013 |
| KR | 10-2015-0072019 A | 6/2015 |
| KR | 10-2015-0089164 A | 8/2015 |
| KR | 10-2015-0089554 A | 8/2015 |
| KR | 10-2016-0084110 A | 7/2016 |

* cited by examiner

BATTERY CELL DEGASSING APPARATUS

TECHNICAL FIELD

The present disclosure relates to a battery cell degassing apparatus.

The present application claims priority to Korean Patent Application No. 10-2016-0162977 filed on Dec. 1, 2016 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components.

In recent years, with regard to the battery cell, a pouch-type secondary battery has been generally used as a lithium polymer battery. The pouch-type secondary battery is frequently used recently since it has a high energy density per unit weight and volume and easily allows a thin and light design of the battery cell.

A method of manufacturing a battery cell serving as a conventional pouch-type secondary battery will be described below.

First, a positive electrode plate and a negative electrode plate are manufactured, and a separator is interposed therebetween, and then laminated to form an electrode assembly. Then, a plasticizer (DBP) is extracted from the electrode assembly, an electrode tab is welded to an electrode lead of the electrode assembly, and the electrode assembly is included in a pouch case. After the electrode assembly is included in the pouch case, an electrolyte is injected into the pouch case so that the electrode assembly is impregnated with the electrolyte solution. If the electrolyte is injected as described above, the edges of the pouch case are bonded by heat fusion to seal the pouch case.

After that, the battery cell assembled as above is subjected to an aging process for stabilization, and then a charge/discharge process is performed to activate the battery cell. However, during the charge/discharge process, an irreversible reaction occurs between the electrolyte and additives due to the formation of a solid electrolyte interphase (SEI) layer, and gas is generated at this time. The gas inside the pouch case needs to be removed, and if the gas is not removed, a failure occurs in the battery cell. Thus, a degassing process is performed using a battery cell degassing apparatus in order to remove the gas inside the pouch case.

Conventionally, a battery cell degassing apparatus generally removes gas after the battery cell is pressed. In this case, the gas near a center of the pouch case of the battery cell is not removed easily.

In order to solve this problem, rolling is performed using a rolling device before the battery cell is pressed. However, in this case, since the rolling process and the pressing process are performed separately, which lowers the process efficiency and deteriorates the gas removing efficiency.

In addition, the conventional battery cell degassing apparatus may contaminate the exterior of the battery cell since the body of the pouch case may become dirty due to the electrolyte discharged during the degassing process.

Thus, it is required to provide a battery cell degassing apparatus which may increase the gas removal efficiency from the battery cell while degassing the battery cell and minimize the external contamination of the battery cell due to the electrolyte leakage.

DISCLOSURE

Technical Problem

The present disclosure is designed to solve the problems of the related art, and therefore the present disclosure is directed to providing a battery cell degassing apparatus which may increase the gas removal efficiency from a battery cell while degassing the battery cell and minimize the external contamination of the battery cell due to the electrolyte leakage

Technical Solution

In one aspect of the present disclosure, there is provided a battery cell degassing apparatus for degassing a battery cell having a gas pocket, comprising: a chamber cover to which the battery cell is detachably mounted; a vacuum chamber coupled to the chamber cover and configured to accommodate the battery cell in a vacuum environment, the chamber cover being slidable in a horizontal direction with respect to the vacuum chamber; a piercing unit provided at the vacuum chamber to pierce a part of the gas pocket; and a pressing unit provided at the vacuum chamber to be spaced apart from the piercing unit and configured to flatten an upper surface and a lower surface of the battery cell and to discharge a gas inside the battery cell to the outside of the battery cell.

The chamber cover may include a cover body detachably coupled to the vacuum chamber to cover one side of the vacuum chamber; and a support jig provided at the cover body to support the battery cell.

The support jig may include: a side jig movably mounted to an inner wall of the cover body to support opposite sides of the battery cell; and a guide jig mounted to the inner wall of the cover body to make the battery cell be spaced apart from the inner wall of the cover body.

The side jig may be mounted to the cover body to be movable in at least one of the horizontal direction and a vertical direction with respect to the cover body.

The piercing unit may include: a first piercing part provided above the gas pocket inside the vacuum chamber; and a second piercing part disposed to face the first piercing part such that the gas pocket is interposable therebetween.

The first piercing part may include a perforating element to perforate a part of the gas pocket.

The second piercing part may include a perforation support disposed to face the perforating element to support the perforating element when the perforating element performs perforation of the gas pocket.

The first piercing part may include a vacuum pad that is vacuum-attachable to the gas pocket to lift the gas pocket upwards.

The second piercing part may include an anti-contamination guide that is contactable with a lower side of the gas pocket to absorb an electrolyte leaking out of the gas pocket.

The pressing unit may include: a first pressing part provided above the battery cell when the battery cell is inside the vacuum chamber to flatten and press the upper surface of the battery cell; and a second pressing part disposed to face the first pressing part to flatten and press the lower surface of the battery cell when the battery cell is interposed therebetween.

The first pressing part may include: a pressing part body configured to flatten and press the upper surface of the battery cell; and a lifting element connected to the pressing part body to move the pressing part body.

At least one roller may be provided below the pressing part body to slidably contact a part of the upper surface of the battery cell. The pressing part body may be horizontally moveable toward the gas pocket.

The second pressing part may include: a pressing part body configured to flatten and press the lower surface of the battery cell; and a lifting element connected to the pressing part body to move the pressing part body.

At least one roller may be provided on the pressing part body to slidably contact a part of the lower surface of the battery cell. The pressing part body may be horizontally movable toward the gas pocket.

The battery cell may be a pouch-type secondary battery.

Advantageous Effects

According to various embodiments as above, it is possible to provide a battery cell degassing apparatus which may increase the gas removal efficiency from the battery cell while degassing the battery cell and minimize the external contamination of the battery cell due to the electrolyte leakage.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
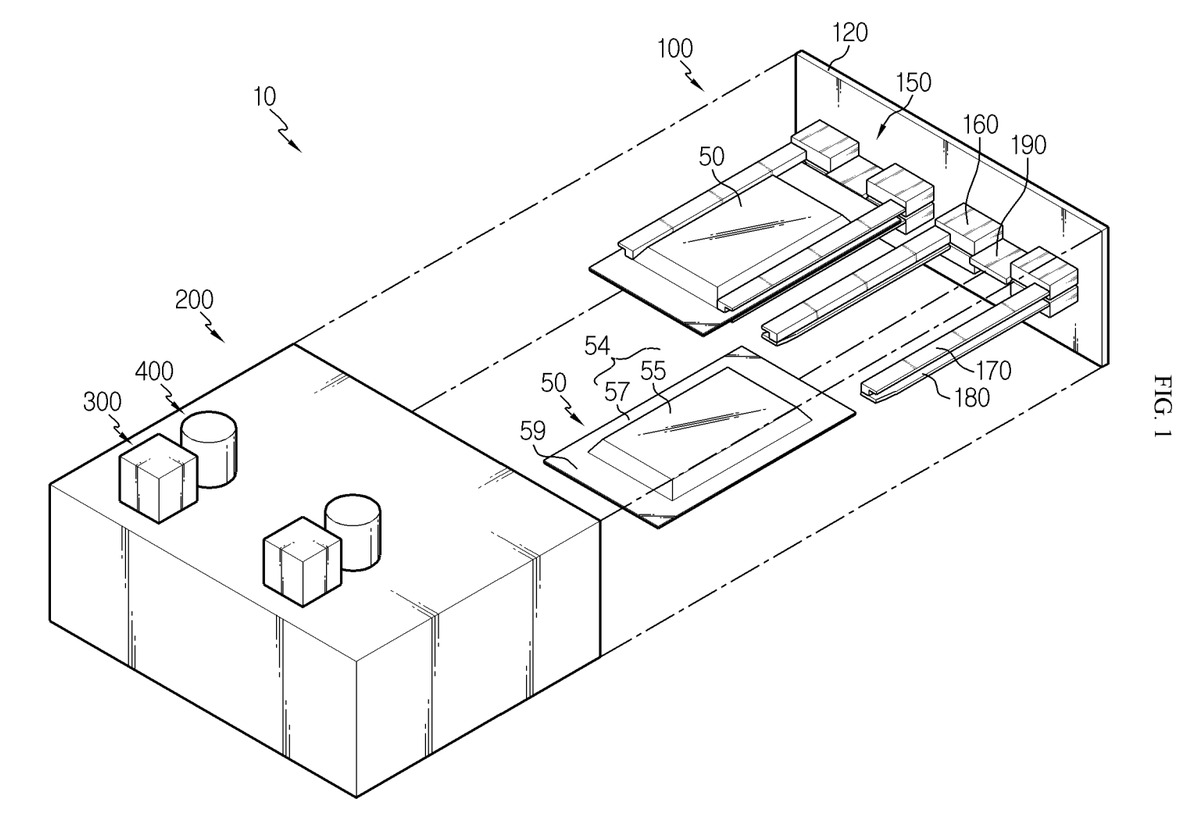
FIG. 1 is a diagram for illustrating a battery cell degassing apparatus according to an embodiment of the present disclosure.
Figure 2:
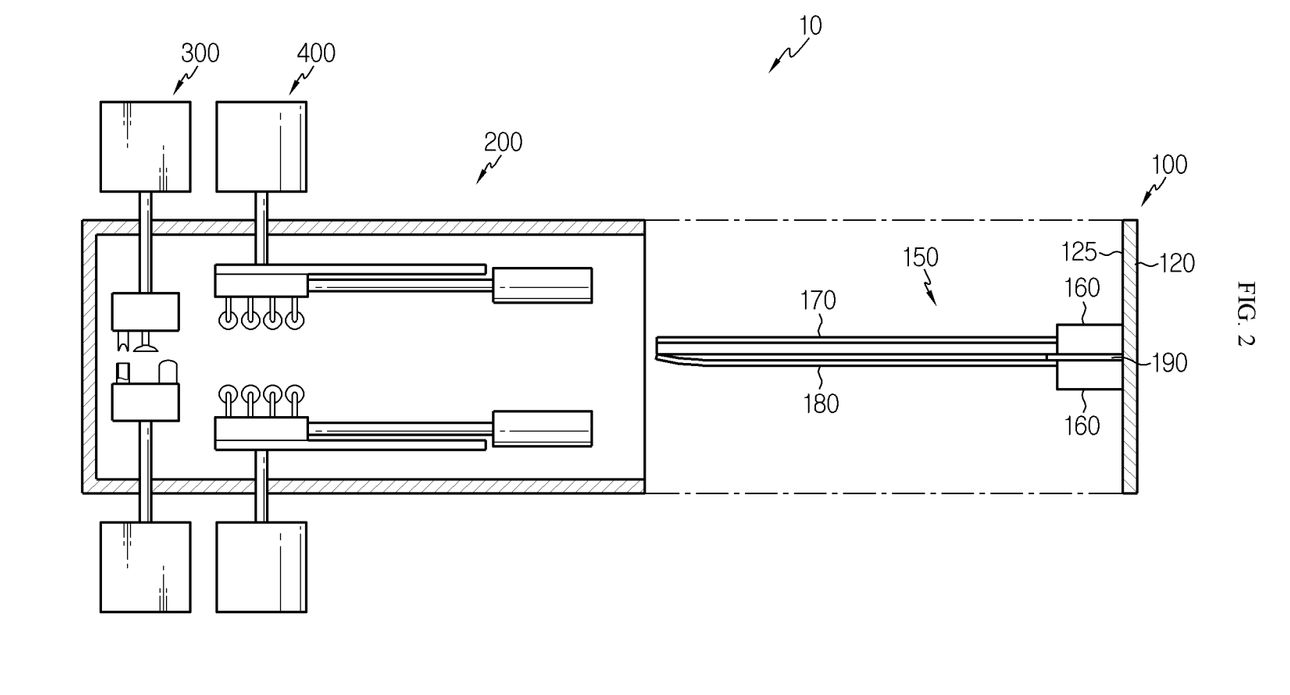
FIG. 2 is a side view showing the battery cell degassing apparatus of FIG. 1.
Figure 3:
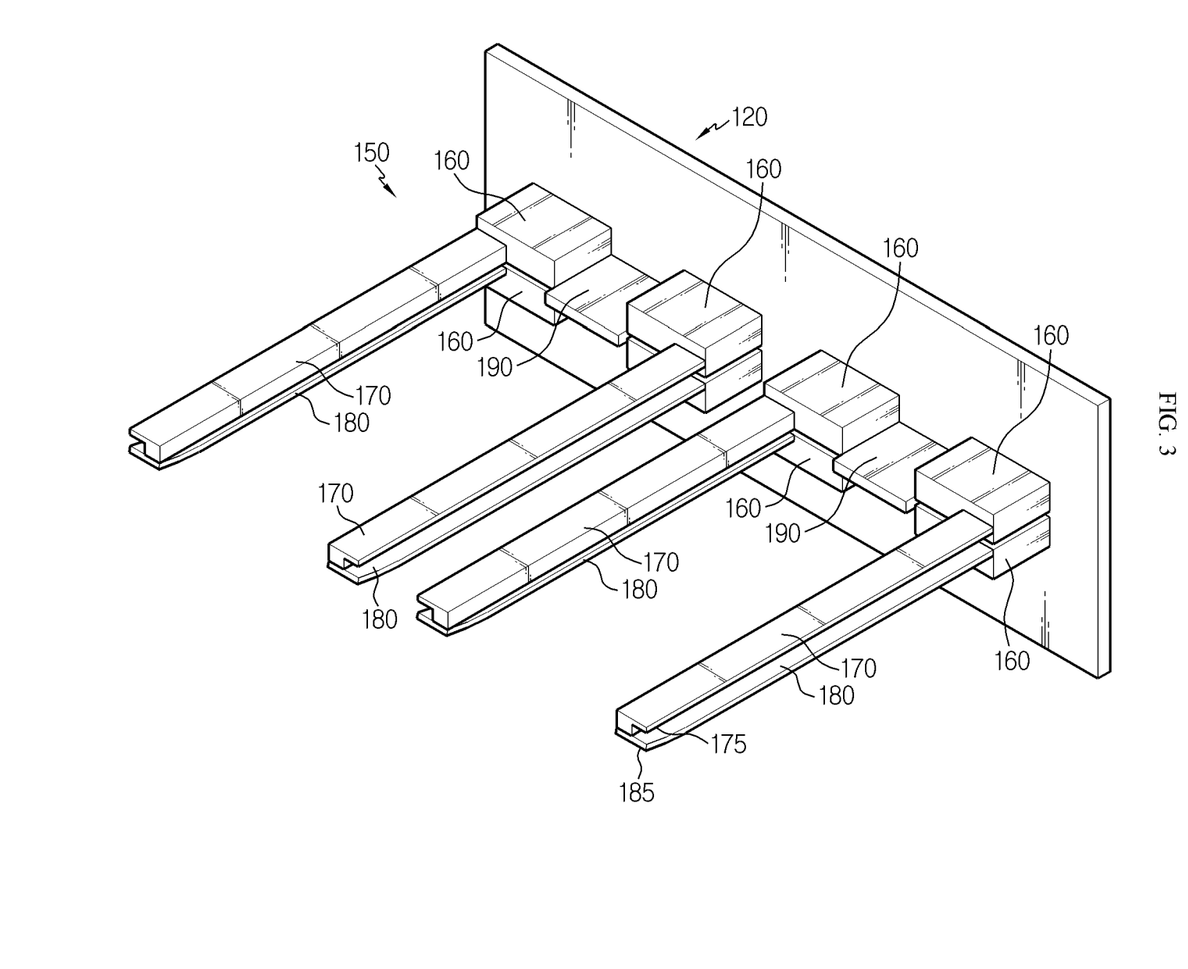
FIGS. 3 and 4 are diagrams for illustrating a chamber cover employed at the battery cell degassing apparatus of FIG. 1.
Figure 4:
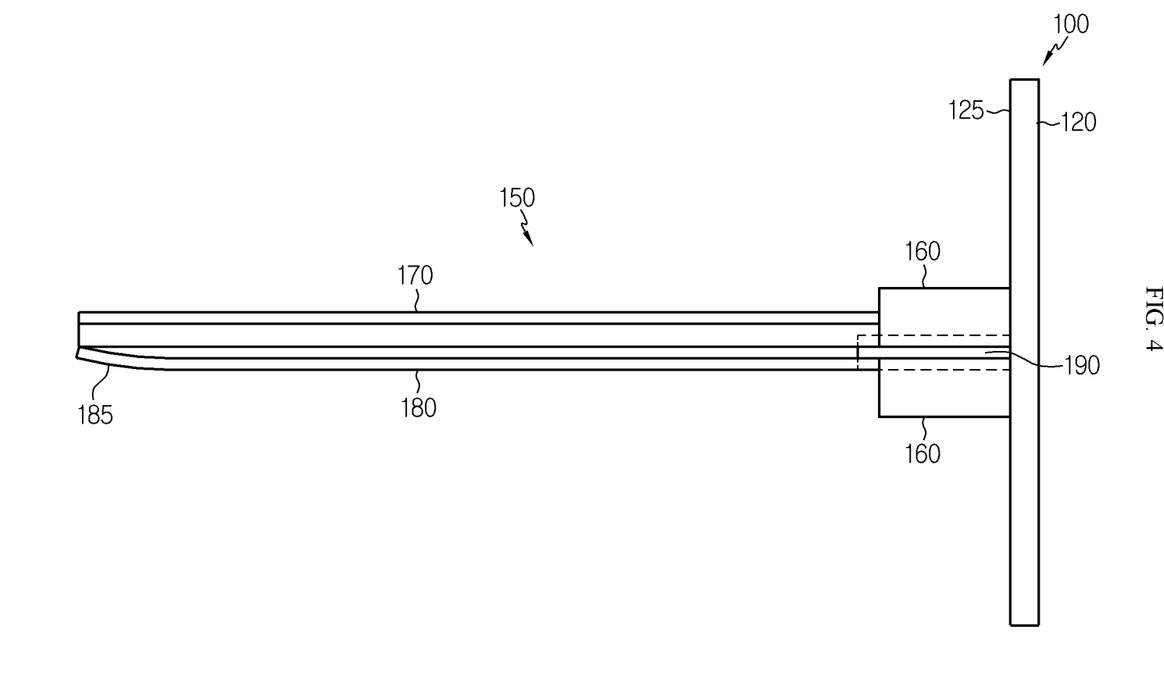
Figure 5:
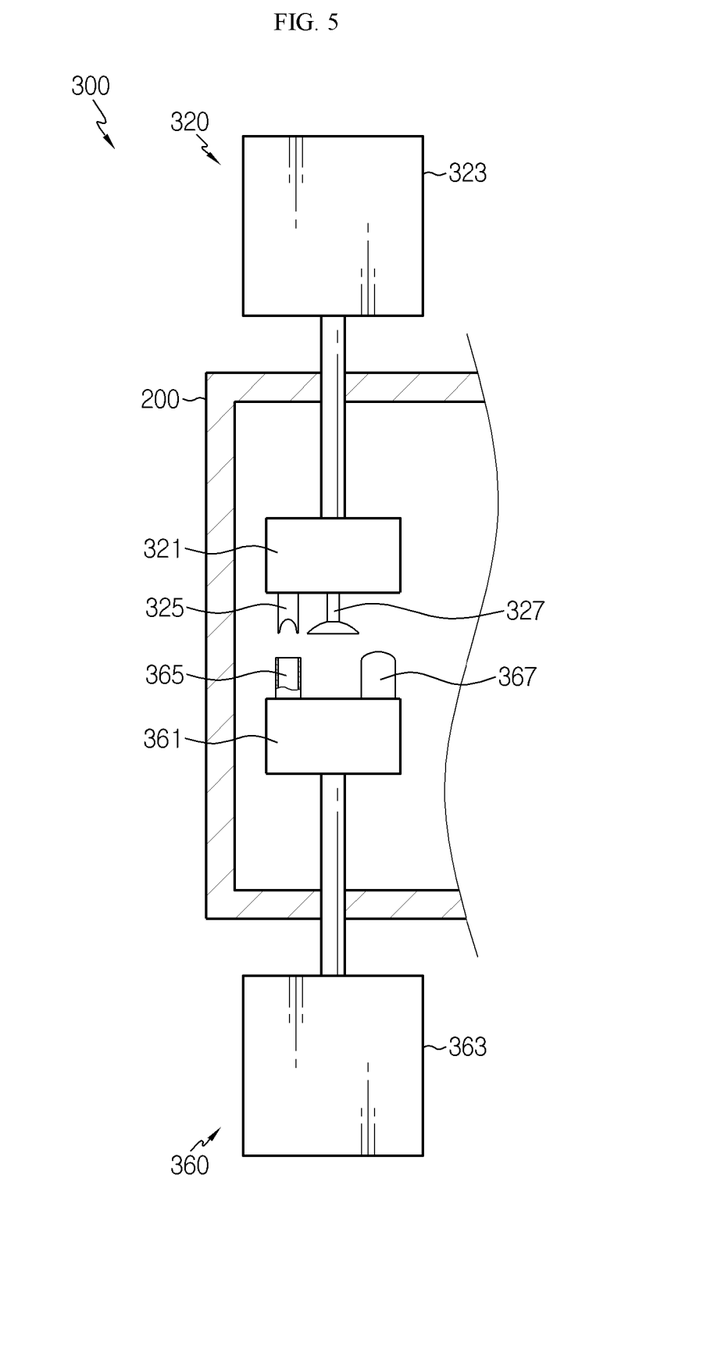
FIG. 5 is a diagram for illustrating a piercing unit employed at the battery cell degassing apparatus of FIG. 1.
Figure 6:
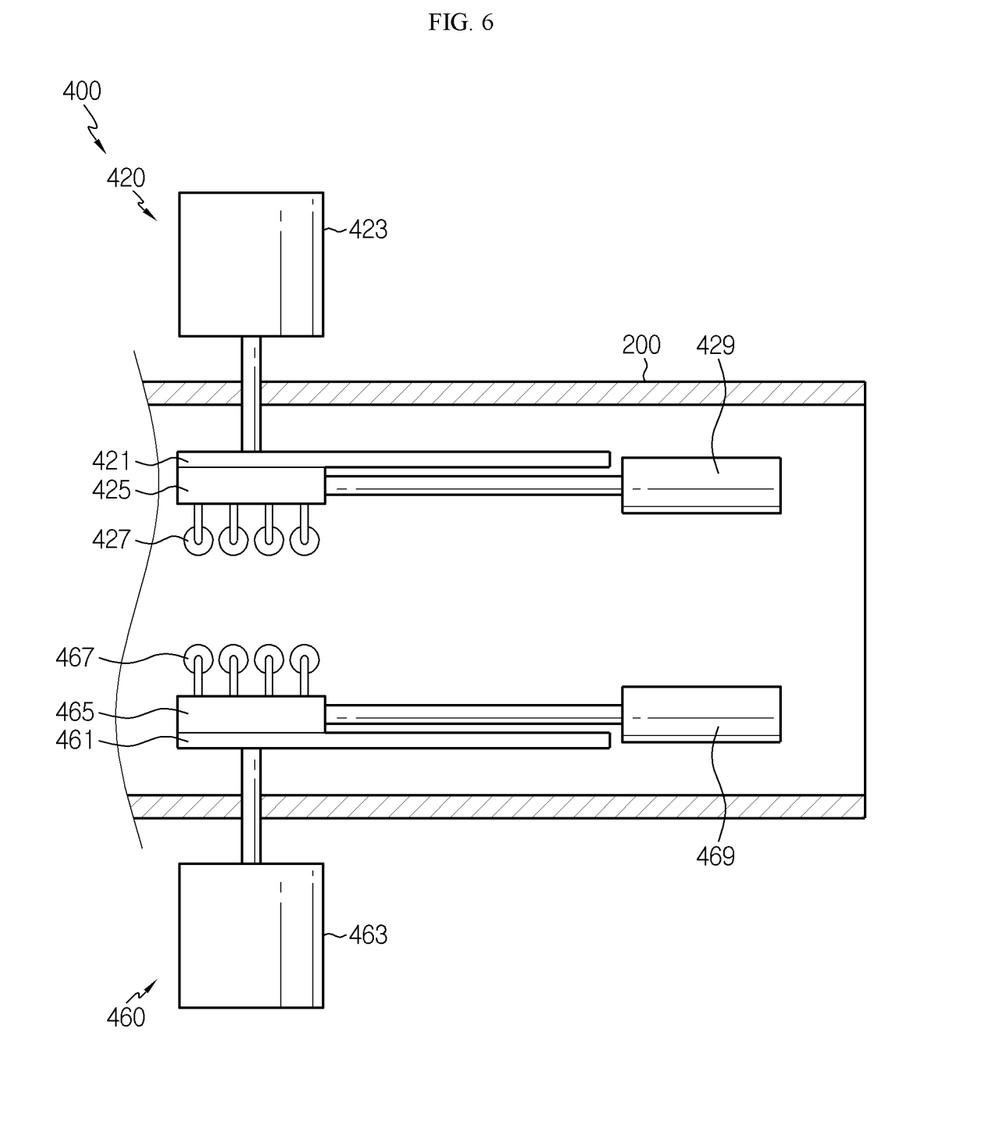
FIG. 6 is a diagram for illustrating a pressing unit employed at the battery cell degassing apparatus of FIG. 1.

FIG. 1 is a diagram for illustrating a battery cell degassing apparatus according to an embodiment of the present disclosure, FIG. 2 is a side view showing the battery cell degassing apparatus of FIG. 1, FIGS. 3 and 4 are diagrams for illustrating a chamber cover employed at the battery cell degassing apparatus of FIG. 1, FIG. 5 is a diagram for illustrating a piercing unit employed at the battery cell degassing apparatus of FIG. 1, and FIG. 6 is a diagram for illustrating a pressing unit employed at the battery cell degassing apparatus of FIG. 1.

Referring to FIGS. 1 to 6, a battery cell degassing apparatus 10 is used for degassing a battery cell 50 and may include a chamber cover 100, a vacuum chamber 200, a piercing unit 300 and a pressing unit 400.

The battery cell 50 may be a pouch-type secondary battery. The battery cell 50 may include an electrode assembly 52, an electrode lead (not shown), a pouch case 54 and a gas pocket 59.

The electrode assembly 52 may be composed of a positive electrode plate, a negative electrode plate and a separator. An electrode lead is connected to the electrode assembly and may include a positive electrode lead and a negative electrode lead. The electrode assembly 52 and the electrode lead are well known in the art and thus are not described in detail here.

The pouch case 54 accommodates the electrode assembly 52, and the pouch case 54 may be filled with an electrolyte. The pouch case 54 may include a case body 55 and a case rim 57.

The case body 55 may form an accommodation space capable of accommodating the electrode assembly 52. The case rim 57 extends from the case body 55 and may be sealed to keep the electrode assembly 52 and the electrolyte in an airtight state.

The gas pocket 59 may be provided at one side of the case rim 57. The gas pocket 59 may be pierced by a piercing unit 300, explained later, to discharge the gas inside the battery cell 50 to the outside of the battery cell 50.

The chamber cover 100 slides in a horizontal direction along a vacuum chamber 200, explained later, and may be detachably coupled to the vacuum chamber 200, explained later. The battery cell 50 may be detachably placed on the chamber cover 100. The battery cell 50 may be accommodated in the vacuum chamber 200 through the chamber cover 100.

The chamber cover 100 may include a cover body 120 and a support jig 150.

The cover body 120 is detachably coupled to the vacuum chamber 200 and may cover one side of the vacuum chamber 200, specifically a front side of the vacuum chamber 200.

The support jig 150 is provided at an inner wall 125 of the cover body 120 and may support the battery cell 50. At least one support jig 150 may be provided. Hereinafter, this embodiment will be explained based on the case where a pair of support jigs 150 is provided.

The support jig 150 may include side jigs 160, 170, 180 and a guide jig 190.

The side jigs 160, 170, 180 are movably mounted to the inner wall 125 of the cover body 120 and may support both sides of the battery cell 50, specifically both sides of the case rim 57.

The side jigs 160, 170, 180 may be mounted to the cover body 120 to be movable in at least one of a horizontal direction and a vertical direction of the cover body 120 in order to support battery cells 50 of various sizes.

In detail, the side jigs 160, 170, 180 may include a body mounting portion 160, a side upper bridge 170 and a side lower bridge 180.

The body mounting portion 160 is movably mounted to the inner wall 125 of the cover body 120, and the body mounting portion 160 may be mounted to the inner wall 125 of the cover body 120 to be movable in a horizontal direction of the cover body 120, specifically in a right and left direction of the cover body 120. The body mounting portion 160 may be provided in plural, and in this embodiment, four body mounting portions 160 are disposed to be spaced apart from each other.

The side upper bridge 170 may be mounted to body mounting portions 160 provided at an upper side, among the plurality of body mounting portions 160. The side upper bridge 170 may be provided in a pair.

The pair of side upper bridges 170 may be mounted to the body mounting portion 160 to be respectively movable in a vertical direction of the body mounting portion 160, specifically in an upper and lower direction of the cover body 120. Here, an elastic member may be included in the body mounting portion 160 to give an elastic force to the pair of side upper bridges 170.

The pair of side upper bridges 170 may support upper portions of both sides of the case rim 57 of the pouch case 54 so that the battery cell 50 may be supported.

In addition, a handle 175 may be formed at each of the pair of side upper bridge 170.

The handle 175 may be formed at a side of each side upper bridge 170. The handle 175 may guide a manipulation of a worker or the like for moving the side upper bridges 170 in an upper and lower direction.

The side lower bridge 180 may be mounted to a body mounting portions 160 located at a lower side, among the plurality of body mounting portions 160. The side lower bridge 180 may be provided in a pair.

The pair of side lower bridges 180 may be mounted to the body mounting portion 160 to be respectively movable in a vertical direction of the body mounting portion 160, specifically in an upper and lower direction of the cover body 120. Here, an elastic member may be included in the body mounting portion 160 to give an elastic force to the pair of side lower bridges 180.

The pair of side lower bridges 180 may support lower portions of both sides of the case rim 57 of the pouch case 54 so that the battery cell 50 may be supported.

Ends 185 of the pair of side lower bridges 180 may have elasticity and be bent toward the pair of side upper bridges 170. In this case, when supporting the battery cell 50, the pair of side lower bridges 180 may support the battery cell 50 more stably.

By using the pair of side lower bridges 180, the pair of side upper bridges 170 and the body mounting portions 160, a worker or the like may appropriately move these components suitable for the size of the battery cell 50. Accordingly, in this embodiment, all of the battery cells 50 of various sizes may be stably supported during the process by means of the side jigs 160, 170, 180.

The guide jig 190 is mounted to the inner wall 125 of the cover body 120 and may allow the battery cell 50 to be spaced apart from the inner wall of the cover body 120. When an impact or the like occurs out of the cover body 120, the guide jig 190 may preferentially offset the impact transferred to the battery cell 50.

The vacuum chamber 200 is detachably coupled to the chamber cover 100 and may form an accommodation space capable of accommodating the at least one battery cell 50.

The vacuum chamber 200 may form a vacuum environment therein when the battery cell 50 is degassed. Accordingly, in this embodiment, the battery cell 50 may be degassed in the vacuum chamber 200 that is in the vacuum environment.

The piercing unit 300 is provided at the vacuum chamber 200 and may pierce a part of the gas pocket 59 of the battery cell 50 so that the gas in the battery cell 50 may be discharged out.

The piercing unit 300 may include a first piercing part 320 and a second piercing part 360.

The first piercing part 320 is at least partially provided above the vacuum chamber 200 and may be provided above the gas pocket 59 of the battery cell 50 inside the vacuum chamber 200.

The first piercing part 320 may include a piercing body 321, a piercing lifting element 323, a perforating element 325 and a vacuum pad 327.

The piercing body 321 is disposed at a rear side in the vacuum chamber 200 and may be disposed above the gas pocket 59 of the battery cell 50 when the battery cell 50 is accommodated in the vacuum chamber 200.

The piercing lifting element 323 is connected to the piercing body 321 and may be at least partially dispose at an upper portion out of the vacuum chamber 200. The piercing lifting element 323 may move the piercing body 321 in an upper and lower direction inside the vacuum chamber 200. For this, the piercing lifting element 323 may be provided as a pneumatic piston. The piercing lifting element 323 may also be any structure capable of moving the piercing body 321 in the upper and lower direction in any manner, other than the pneumatic piston.

The perforating element 325 is used for perforating a part of the gas pocket 59 of the battery cell 50 and may be provided below the piercing body 321. The perforating element 325 may move in an upper and lower direction along with the upper and lower movement of the piercing body 321.

The vacuum pad 327 may be vacuum-attached to the gas pocket 59 of the battery cell 50 and may be provided below the piercing body 321. The vacuum pad 327 may lift an upper side of the gas pocket 59 as the piercing body 321 moves in an upper and lower direction, so that the gas pocket 59 is partially widened.

The second piercing part 360 is at least partially provided below the vacuum chamber 200 and may be provided below the gas pocket 59 of the battery cell 50 inside the vacuum chamber 200. In other words, the second piercing part 360 may be disposed to face the first piercing part 320 with the gas pocket 59 being interposed therebetween.

The second piercing part 360 may include a piercing body 361, a piercing lifting element 363, a perforation support 365 and an anti-contamination guide 367.

The piercing body 361 is disposed at a rear side in the vacuum chamber 200 and may be disposed below the gas pocket 59 of the battery cell 50 when the battery cell 50 is accommodated in the vacuum chamber 200.

The piercing lifting element 363 is connected to the piercing body 361 and may be at least partially disposed at a lower portion out of the vacuum chamber 200. The piercing lifting element 363 may move the piercing body 361 in an upper and lower direction inside the vacuum chamber 200. For this, the piercing lifting element 363 may be provided as a pneumatic piston. The piercing lifting element 363 may also be any structure capable of moving the piercing body 361 in the upper and lower direction in any manner, other than the pneumatic piston.

The perforation support 365 is provided above the piercing body 361 and may be disposed to face the perforating element 325 with the gas pocket 59 being interposed therebetween. The perforation support 365 may guide the perforating work of the perforating element 325 while supporting the perforating element 325 when the perforating element 325 performs perforation.

The anti-contamination guide 367 is provided above the piercing body 361 and may be disposed to contact the gas pocket 59 of the battery cell 50 as the piercing body 361 moves in an upper and lower direction.

The anti-contamination guide 367 may absorb an electrolyte, which may leak out through a piercing hole P of the gas pocket 59, explained later, when the gas in the battery cell 50 is discharged. For this, the anti-contamination guide 367 may be made of a material with great moisture absorption property, for example a sponge material.

The pressing unit 400 is provided at the vacuum chamber 200 to be spaced apart from the piercing unit 300 and may discharge the gas in the battery cell 50 to the outside of the battery cell 50 while flattening an upper surface and a lower surface of the battery cell 50.

The pressing unit 400 may include a first pressing part 420 and a second pressing part 460.

The first pressing part 420 is at least partially provided above the vacuum chamber 200 and may be provided above the battery cell 50 inside the vacuum chamber 200. The first pressing part 420 may flatten and press the upper surface of the battery cell 50.

The first pressing part 420 may include a pressing part body 421, a lifting element 423, a roller unit 425 and a driving element 429.

The pressing part body 421 is disposed above the battery cell 50 when the battery cell 50 is accommodated in the vacuum chamber 200 and may flatten and press the upper surface of the battery cell 50, specifically the upper surface of the case body 55 of the pouch case 54.

The lifting element 423 is connected to the pressing part body 421 and may be at least partially provided at an upper side out of the vacuum chamber 200. The lifting element 423 may move the pressing part body 421 in an upper and lower direction inside the vacuum chamber 200. For this, the lifting element 423 may be provided as a pneumatic piston. The lifting element 423 may also be any structure capable of moving the pressing part body 421 in the upper and lower direction in any manner, other than the pneumatic piston.

The roller unit 425 is mounted below the pressing part body 421 and may slide in a horizontal direction of the vacuum chamber 200, namely in a front and rear direction of the vacuum chamber 200.

The roller unit 425 may include a roller 427.

The roller 427 may be in slidable contact with a part of the upper surface of the battery cell 50, specifically the upper surface of the case body 55 of the pouch case 54. The roller 427 may move horizontally toward the gas pocket 59 of the battery cell 50 when the battery cell 50 is flattened.

The roller 427 may be provided in plural. The plurality of rollers 427 may be disposed to be spaced apart from each other by a predetermined distance in a front and rear direction of the pressing part body 421.

The driving element 429 is provided inside the vacuum chamber 200 and may be connected to the roller unit 425. The driving element 429 may allow the roller unit 425 to slide in the front and rear direction.

The second pressing part 460 is at least partially provided below the vacuum chamber 200 and may be provided below the battery cell 50 inside the vacuum chamber 200. In other words, the second pressing part 460 may be disposed to face the first pressing part 420 with the battery cell 50 being interposed therebetween. The second pressing part 460 may flatten and press the lower surface of the battery cell 50.

The second pressing part 460 may include a pressing part body 461, a lifting element 463, a roller unit 465 and a driving element 469.

The pressing part body 461 is disposed below the battery cell 50 when the battery cell 50 is accommodated in the vacuum chamber 200 and may flatten and press the lower surface of the battery cell 50, specifically the lower surface of the case body 55 of the pouch case 54.

The lifting element 463 is connected to the pressing part body 461 and may be at least partially provided at a lower side out of the vacuum chamber 200. The lifting element 463 may move the pressing part body 461 in an upper and lower direction inside the vacuum chamber 200. For this, the lifting element 463 may be provided as a pneumatic piston. The lifting element 463 may also be any structure capable of moving the pressing part body 461 in the upper and lower direction in any manner, other than the pneumatic piston.

The roller unit 465 may be mounted on the pressing part body 461 and may slide in a horizontal direction of the vacuum chamber 200, namely in a front and rear direction of the vacuum chamber 200.

The roller unit 465 may include a roller 467.

The roller 467 may be in slidable contact with a part of the lower surface of the battery cell 50, specifically the lower surface of the case body 55 of the pouch case 54. The roller 467 may move horizontally toward the gas pocket 59 of the battery cell 50 when the battery cell 50 is flattened.

The roller 467 may be provided in plural. The plurality of rollers 467 may be disposed to be spaced apart from each other by a predetermined distance in a front and rear direction of the pressing part body 461.

The driving element 469 is provided inside the vacuum chamber 200 and may be connected to the roller unit 465. The driving element 469 may allow the roller unit 465 to slide in the front and rear direction.

Hereinafter, detailed operations of the battery cell degassing apparatus 10 configured as above will be described in more detail.

FIGS. 7 to 12 are diagrams for illustrating operations of the battery cell degassing apparatus of FIG. 1.

Figure 7:
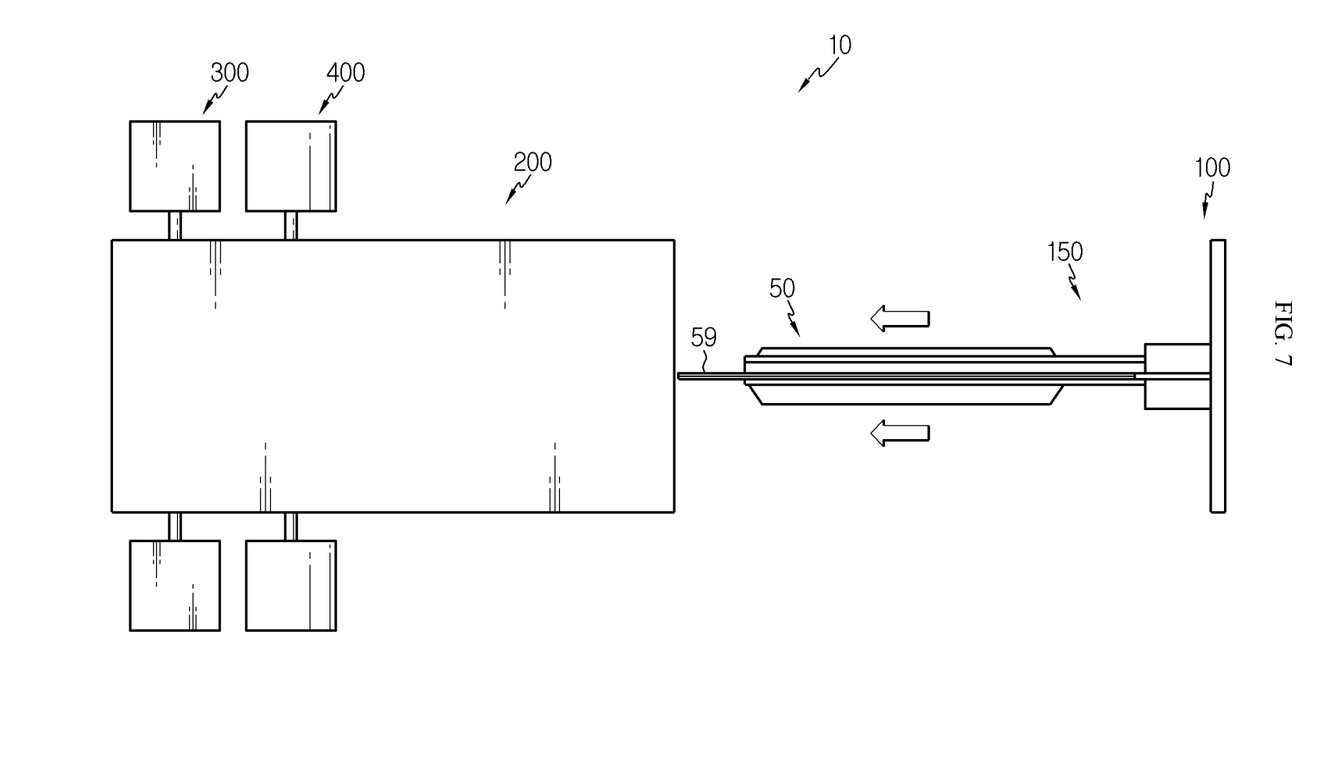
FIGS. 7 to 12 are diagrams for illustrating operations of the battery cell degassing apparatus of FIG. 1.
Figure 8:
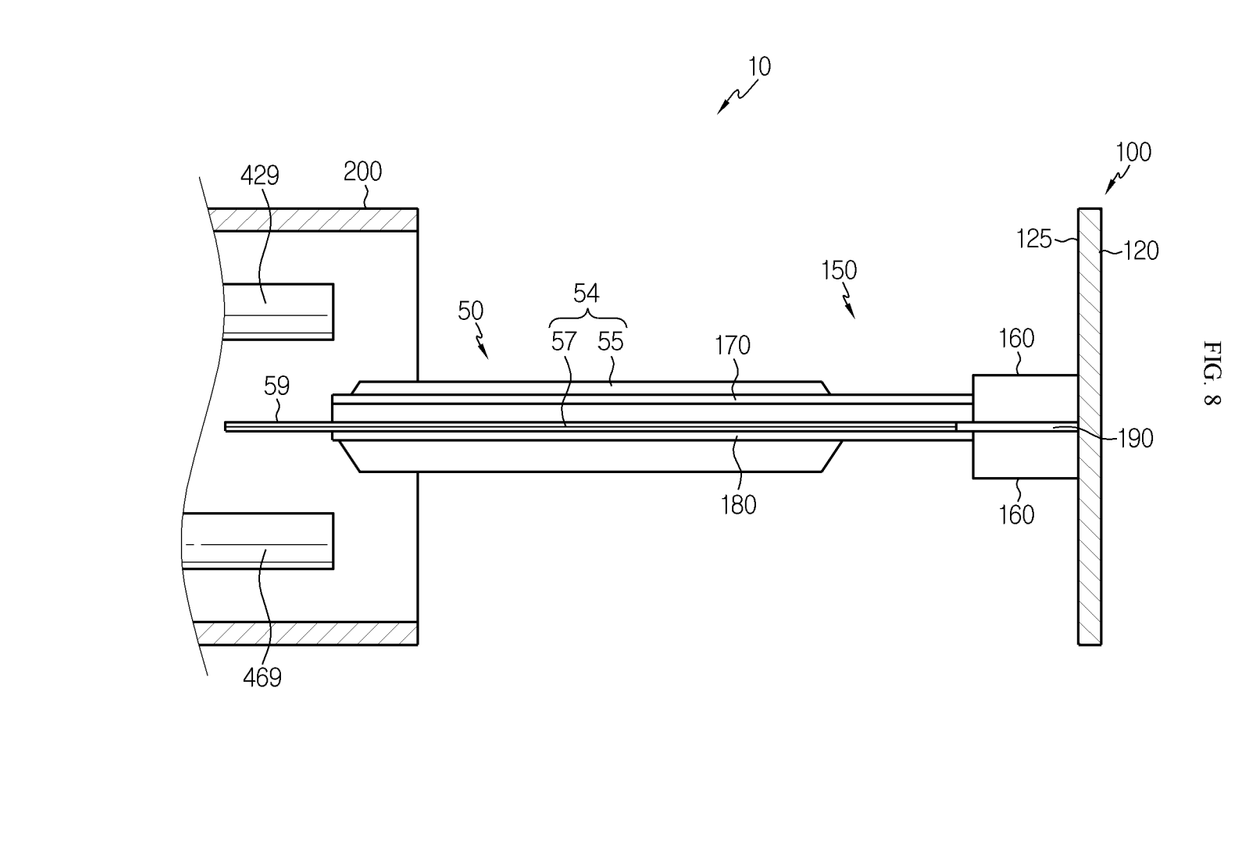

Referring to FIGS. 7 and 8, first, a worker or the like may mount the battery cell 50 to the support jig 150 of the chamber cover 100. At this time, the worker or the like may suitably move the side jigs 160, 170, 180 according to the size of the battery cell 50 and fix the side jigs 160, 170, 180 to both sides of the battery cell 50.

If the battery cell 50 is completely mounted to the chamber cover 100, the worker or the like may slide the chamber cover 100 to be coupled to the vacuum chamber 200.

Figure 9:
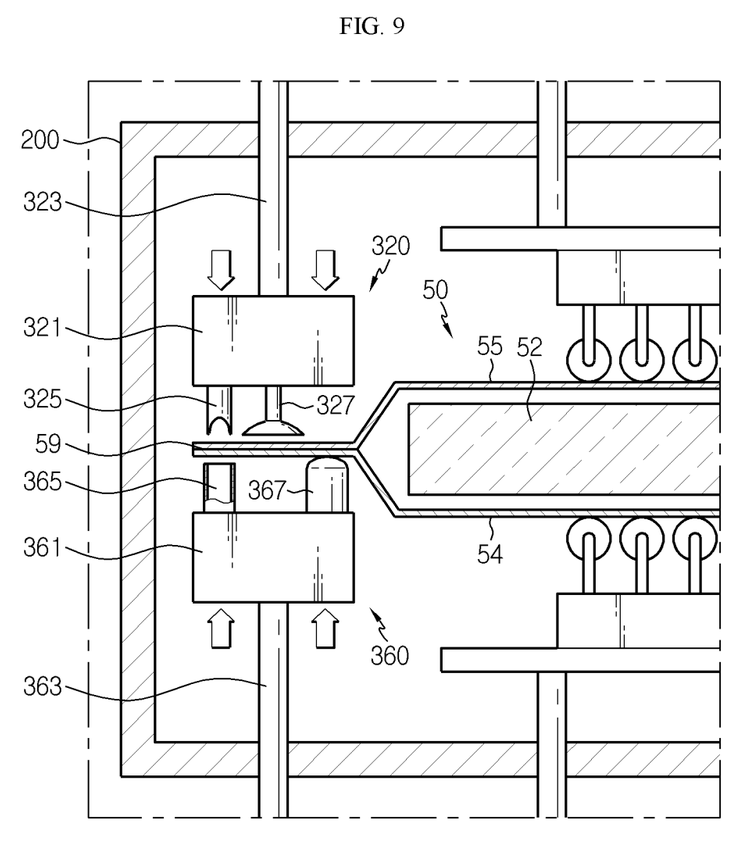

Referring to FIG. 9, if the battery cell 50 is disposed inside the vacuum chamber 200, the worker or the like may move the first piercing part 320 and the second piercing part 360 in an upper and lower direction to make contact with the gas pocket 59 of the battery cell 50.

Figure 10:
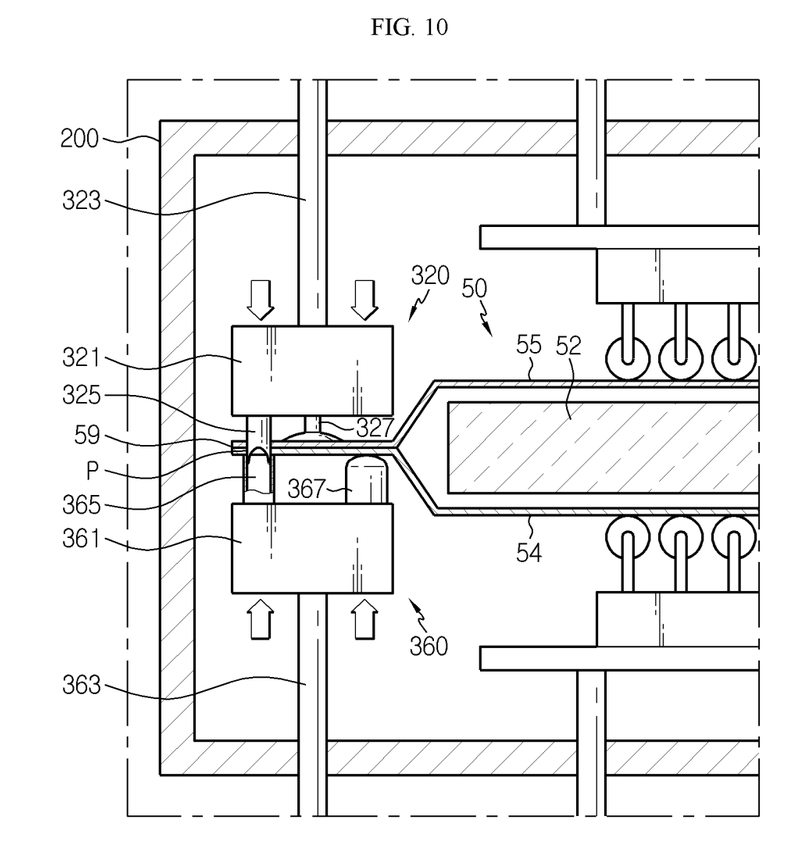

Referring to FIG. 10, after that, the worker or the like may slide the piercing body 321 of the first piercing part 320 in a lower direction and slide the piercing body 361 of the second piercing part 360 in an upper direction.

By the sliding, the perforating element 325 may form a piercing hole P in the gas pocket 59 together with the perforation support 365. In addition, by the sliding, the vacuum pad 327 may be adsorbed to the upper surface of the gas pocket 59.

Figure 11:
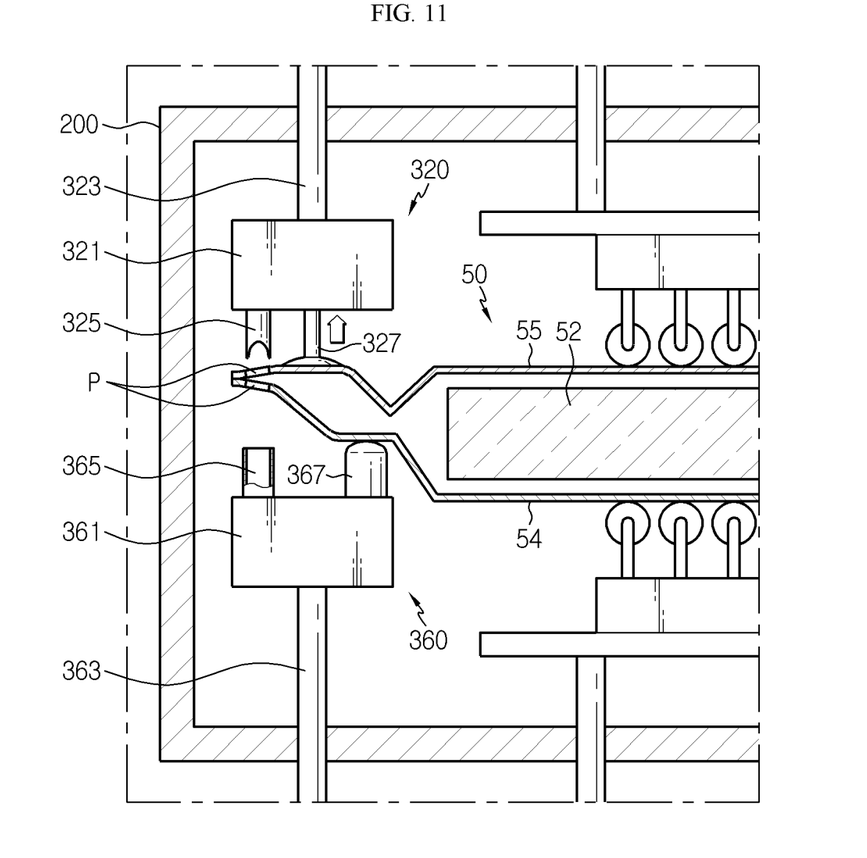

Referring to FIG. 11, the worker or the like may slide the piercing body 321 of the first piercing part 320 in an upper direction. By the sliding, the vacuum pad 327 may move upwards to widen the inside of the gas pocket 59. At this time, the piercing hole P may be disposed at a higher location than the horizontal line of the battery cell 50, and the anti-contamination guide 367 may be disposed at a lower location than the horizontal line of the battery cell 50.

Figure 12:
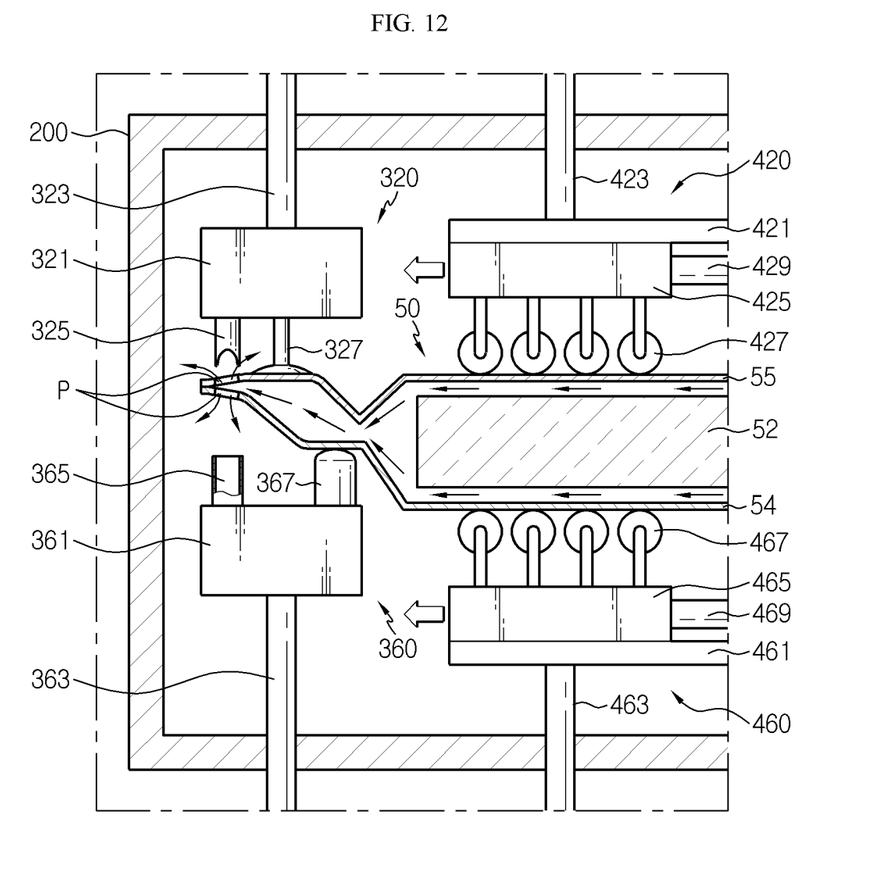

Referring to FIG. 12, after that, the worker or the like may form a vacuum environment inside the vacuum chamber 200. In addition, the worker or the like may move the first pressing part 420 and the second pressing part 460 in an upper and lower direction to contact the upper and lower surfaces of the battery cell 50, namely the upper and lower surfaces of the case body 55 of the pouch case 54.

In addition, the worker or the like may uniformly press the upper and lower surfaces of the battery cell 50, specifically the upper and lower surfaces of the case body 55 of the pouch case 54 while moving the rollers 427 of the first pressing part 420 and the rollers 467 of the second pressing part 460 in a horizontal direction toward the gas pocket 59, respectively.

As described above, in this embodiment, since the upper and lower surfaces of the battery cell 50 are pressed in a rolling manner using the rollers 427, 467, the battery cell 50 may be pressed uniformly, compared to a conventional pressing method. Accordingly, in this embodiment, the gas in the center portion of the battery cell 50 may be effectively guided toward the gas pocket 59.

In addition, in this embodiment, the rolling is performed together inside the vacuum chamber 200 in a vacuum state, and thus the process efficiency may be greatly improved, compared to a case where a vacuum process is performed separately using a separate tool.

In addition, in this embodiment, all of the upper and lower surfaces of the battery cell 50 are pressed and each surface is pressed using the plurality of rollers 427, 467, and thus the pressing efficiency may be greatly improved, compared to a rolling method using a single roller.

By the pressing, the gas in the battery cell 50 may be moved toward the gas pocket 59 and discharged out of the battery cell 50 through the piercing hole P of the gas pocket 59.

In this embodiment, since the inside of the gas pocket 59 is widened in advance by the vacuum pad 327 before the pressing, the gas moved toward the gas pocket 59 may be more smoothly guided toward the piercing hole P of the gas pocket 59.

Moreover, in this embodiment, since the piercing hole P is disposed at a higher location than the horizontal line of the battery cell 50, when the gas is discharged, it is possible to minimize that the electrolyte in the battery cell 50 leaks out of the gas discharge hole P. Even though the electrolyte leaks out of the gas discharge hole P, it is possible to prevent the electrolyte from being transferred to the case body 55 of the pouch case 54, by means of the anti-contamination guide 367. Accordingly, in this embodiment, during the degassing process, it is possible to minimize the external contamination of the battery cell 50 caused by the electrolyte leaking from the battery cell 50.

As described above, the battery cell degassing apparatus 10 according to this embodiment may increase the gas removal efficiency from the battery cell 50 during the degassing process and minimize the external contamination of the battery cell due to the electrolyte leakage While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery cell degassing apparatus for degassing a battery cell having a gas pocket, comprising:
    a chamber cover to which the battery cell is detachably mounted;
    a vacuum chamber with a longitudinal axis coupled to the chamber cover and configured to accommodate the battery cell in a vacuum environment, the chamber cover being slidable in a direction along the longitudinal axis toward and away from the vacuum chamber;
    a piercing unit provided at the vacuum chamber to pierce a part of the gas pocket; and
    a pressing unit provided at the vacuum chamber to be spaced apart from the piercing unit and configured to flatten an upper surface and a lower surface of the battery cell and to discharge a gas inside the battery cell to outside of the battery cell.

2. The battery cell degassing apparatus according to claim 1, wherein the chamber cover includes:
    a cover body detachably coupled to the vacuum chamber to cover one side of the vacuum chamber; and
    a support jig provided at the cover body to support the battery cell.

3. The battery cell degassing apparatus according to claim 2, wherein the support jig includes:
    a side jig movably mounted to an inner wall of the cover body to support opposite sides of the battery cell; and
    a guide jig mounted to the inner wall of the cover body to allow the battery cell to be spaced apart from the inner wall of the cover body.

4. The battery cell degassing apparatus according to claim 3, wherein the side jig is mounted to the cover body to be movable in at least one of a horizontal direction and a vertical direction with respect to the cover body.

5. The battery cell degassing apparatus according to claim 1, wherein the piercing unit includes:
    a first piercing part provided above the gas pocket inside the vacuum chamber; and a second piercing part disposed to face the first piercing part such that the gas pocket is interposable therebetween.

6. The battery cell degassing apparatus according to claim 5, wherein the first piercing part includes a perforating element to perforate a part of the gas pocket.

7. The battery cell degassing apparatus according to claim 6, wherein the second piercing part includes a perforation support disposed to face the perforating element to support the perforating element when the perforating element performs perforation of the gas pocket.

8. The battery cell degassing apparatus according to claim 5, wherein the first piercing part includes a vacuum pad that is vacuum-attachable to the gas pocket to lift the gas pocket upwards.

9. The battery cell degassing apparatus according to claim 5, wherein the second piercing part includes an anti-contamination guide that is contactable with a lower side of the gas pocket to absorb an electrolyte leaking out of the gas pocket.

10. The battery cell degassing apparatus according to claim 1, wherein the pressing unit includes:
 a first pressing part provided above the battery cell when the battery cell is inside the vacuum chamber to flatten and press the upper surface of the battery cell; and
 a second pressing part disposed to face the first pressing part to flatten and press the lower surface of the battery cell when the battery cell is interposed therebetween.

11. The battery cell degassing apparatus according to claim 10, wherein the first pressing part includes:
 a pressing part body configured to flatten and press the upper surface of the battery cell; and
 a lifting element connected to the pressing part body to move the pressing part body.

12. The battery cell degassing apparatus according to claim 11, wherein at least one roller is provided below the pressing part body to slidably contact a part of the upper surface of the battery cell, and wherein the pressing part body is movable toward the gas pocket.

13. The battery cell degassing apparatus according to claim 10, wherein the second pressing part includes:
 a pressing part body configured to flatten and press the lower surface of the battery cell; and
 a lifting element connected to the pressing part body to move the pressing part body.

14. The battery cell degassing apparatus according to claim 13, wherein at least one roller is provided on the pressing part body to slidably contact a part of the lower surface of the battery cell, and wherein the pressing part body is movable toward the gas pocket.

15. The battery cell degassing apparatus according to claim 1, wherein the battery cell is a pouch-type secondary battery.

* * * * *